Patented Aug. 14, 1928.

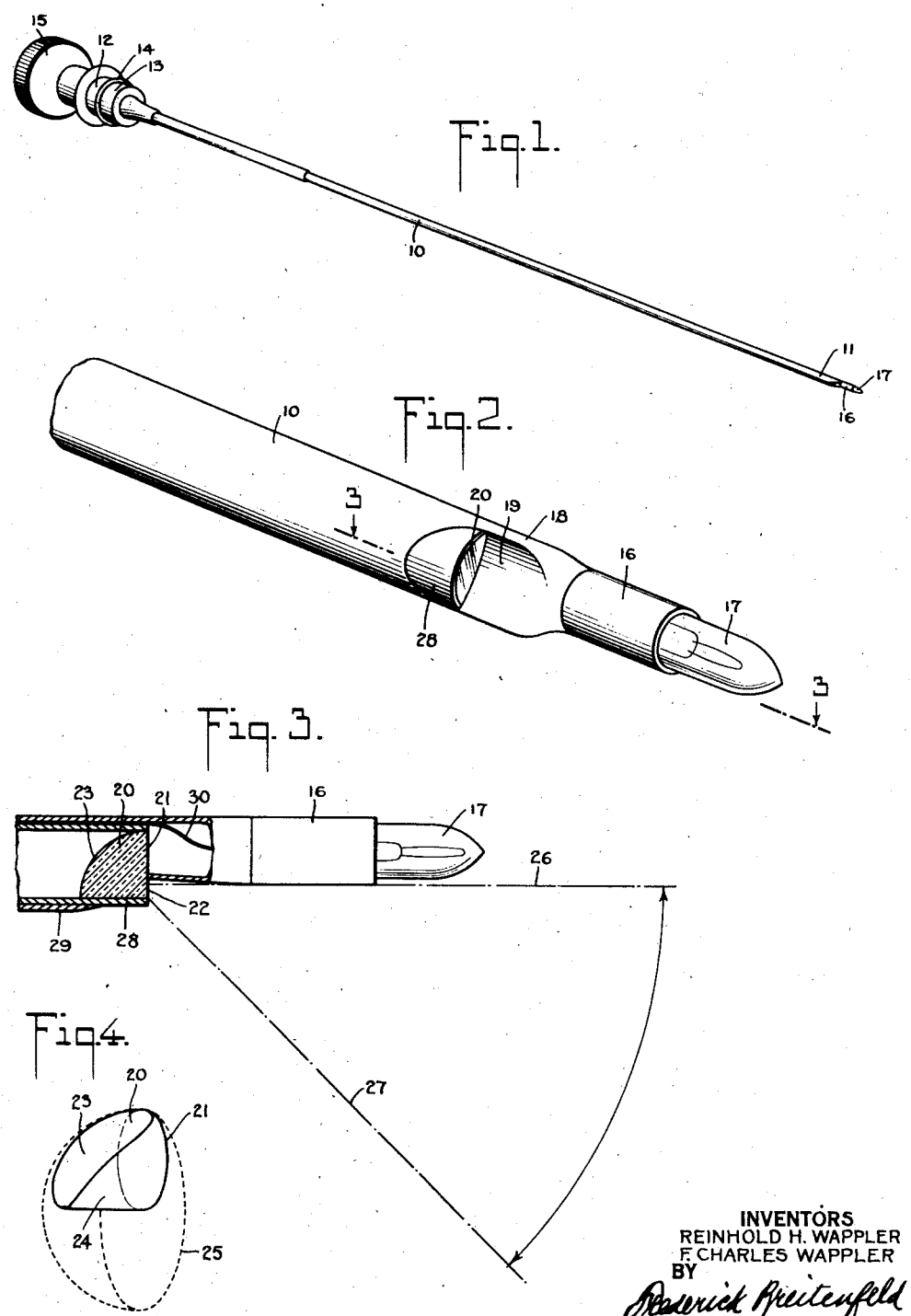

1,680,491

UNITED STATES PATENT OFFICE.

REINHOLD H. WAPPLER, OF YONKERS, AND FREDERICK CHARLES WAPPLER, OF NEW YORK, N. Y.

ILLUMINATING SURGICAL TELESCOPE.

Application filed October 18, 1926, Serial No. 142,286. Renewed December 8, 1927.

Our present invention relates to surgical telescopes, and has particular reference to a type of telescopic device which may be utilized either alone or in conjunction with an endoscopic tube.

It is an object generally of the invention to provide a telescopic device which includes within its unitary structural nature means for illuminating the field of vision, it being contemplated that the device will be usable, either alone or in association with a suitable tube, for the examination of body cavities.

Another object of the invention is to provide a device which will render direct forward vision possible. In this connection, we will premise that illuminated forward vision has heretofore entailed the provision of illuminating means independent of the optical means. In other words, in the employment heretofore of endoscopic tubes of usual construction, forward vision, when desired, has necessitated the provision of one tubular element comprising the telescope, and a second tubular element comprising the lamp-supporting means, the two elements being arranged in close adjacence to each other.

Such arrangements have heretofore raised numerous difficulties. In the first place, it has been necessary to provide an endoscopic tube to form a casing for the elements. In the second place, where the body cavities have been extremely small, as for example the passages leading into the sinuses, it has been practically impossible to insert the endoscopic tube, or for that matter even the two tubular elements alone if such unsheathed insertion had been contemplated. In the third place, where the use of operating instrumentalities has been desirable, the space taken up by the two tubular elements referred to has necessitated the provision of endoscopic tubes of still larger cross-section to permit the accommodation of the operating instrumentalities.

It is an object of the present invention to provide a device which will obviate these, and other, difficulties. One feature of the invention lies in providing a device which may be used independently of an endoscopic tube, its structural nature making such unsheathed insertion feasible.

Another feature lies in providing a device which is cross-sectionally no larger, and in fact possibly smaller, than the ordinary telescopic tubes alone have been. In this way, illuminated vision has been rendered possible, without the necessity for a separate tubular element for accommodating the illuminating means. In accordance with this feature of the invention, direct insertion of the device even into cavities of extreme smallness, is rendered possible. The great advantages of this possibility alone will be obvious.

Our device may also, if desired, be utilized in conjunction with an endoscopic tube, as for example, in cases where operating instrumentalities are to be employed. The features of our invention permit the utilization of an endoscopic tube of greatly reduced size, thereby making it possible not only to examine, but also to operate with illuminated vision in cases where operations have heretofore been beset with great difficulties.

A particular feature of our invention lies in providing a telescope described having at its end a lamp-accommodating portion or extension of reduced cross-section, said portion lying wholly within the space bounded by the extended peripheral surface of said end. Coordinately, a feature lies in providing an objective in said end, said objective being so constructed and arranged that a forward field of vision is rendered visible through the telescope despite the apparently obstructing position of said lamp portion. More particularly, it is a feature of our invention to provide an objective which will render visible through the telescope a field of vision which lies alongside of the lamp portion and which includes the unoccupied portion of the space bounded by the calibre of the telescope ahead of the objective.

Another object is to provide a device wherein the space ahead of the objective will always form a portion of the visible field, regardless of the medium in said field. In other words, if it be said that the innermost limit of the field of vision lies forwardly of the objective and skirts the lamp portion, it is an object of our invention to make provision for rendering said innermost limit unaffected by the existence of air, water, or any other medium, within said field.

More particularly, our invention provides a field of vision which is substantially conical, having its apex adjacent to the exposed portion of the objective, and having its innermost limit defined by a line which skirts the lamp portion; and a feature of our invention lies in providing the objective with an exposed plane surface which is arranged perpendicularly to said line. In this way, a change of medium may affect the axis of the conical field, but it will have no effect upon the line defining the innermost limit.

Further features of the invention lie in the particular structural nature and arrangement of the objective. One particular feature lies in providing an objective whose light-dispersing properties are negligible, and whose axis has been offset with respect to the axis of the tube. More particularly, it is a feature of the invention to provide an objective which will position the entrance pupil of the entire optical system at an extremely small point adjacent to the exposed surface of the objective.

Our invention contemplates the provision of an objective whose opposite surfaces are defined by the opposite surfaces of a plano-convex lens having a diameter substantially twice that of the tube.

Still further features lie in the particular dimensional proportions of the various elements, including the objective, and in the general structural arrangements which permit the lamp-accommodating portion to function.

For the attainment of the foregoing objects and such other objects as may hereinafter appear or be pointed out, we have illustrated one embodiment of our invention in the accompanying drawings in which—

Fig. 1 is a perspective view of our complete device;

Fig. 2 is a greatly enlarged perspective view of the end portion of Fig. 1;

Fig. 3 is a longitudinal fragmentary cross-sectional view of a portion of the device; and Fig. 4 is a diagram showing the structural nature of the objective.

Referring now to the drawings, and particularly to Fig. 1, it will be observed that we have shown a tubular element 10 having a forward end 11 with which the objective and the lamp are associated. At the rear end of the tube 10 we have illustratively one possible arrangement of elements forming necessary accessories. We have shown an enlarged portion which comprises two mutually insulated portions 12 and 13, these portions being separated by a collar 14 of insulating material, whereby connections with opposite terminals of an electric current may be made with said portions 12 and 13 respectively. We have also shown an eyepiece 15 which may be of any desired structural nature for permitting the user to look through the telescope.

It will be obvious that the elements 12—15 may be of any desired nature or arrangement, depending upon requirements of use. For example, where the device is to be employed in association with an endoscopic tube, suitable attaching portions may be provided for properly associating the device with the tube.

Referring now to Figs. 2 and 3, we have provided a lamp-accommodating portion in the form of an extension 16 which is of reduced cross-section, but which is arranged to lie wholly within the extended peripheral bounds of the tube 10. The extension 16 may comprise a socket into which a suitable lamp 17 may be screwed, the diameter of the socket being approximately three-fourths of the diameter of the tube 10. The latter is suitably shaped, as shown at 18, to render the reduction in size gradual. Thus, the innermost boundary of the socket 16 may be observed to extend rearwardly and to merge with a slightly concave surface 19 terminating at the objective 20.

Fig. 3 shows clearly how the objective 20 comprises a forward plane surface 21 only a portion 22 of which is uncovered, the opposite surface of the objective comprising a convexly curved surface 23. The opposite surfaces 22 and 23 are arranged to lie along the surfaces of a plano-convex lens having a diameter substantially twice that of the tube 10.

Referring for the moment to Fig. 4, the structural nature of the objective will be rendered clearer. The tube 10 being preferably cylindrical, the objective 20 comprises a cylindrical element designed to fit snugly within the end of the tube 10. The objective 20 therefore comprises a third and cylindrical surface 24. We have represented in dotted lines 25 a plano-convex lens of substantially twice the diameter of the cylindrical surface 24 and the diameter of the plane surface 21 has been made to coincide with one radius of the lens 25. The opposite surfaces 21 and 23 of the objective are ground and shaped to conformation with the opposite surfaces of an edge of the lens 25. Preferably, the convexity of the surface 23 is such that its radius is about equal to the radius of the lens 25. The latter may therefore be considered to be a substantial hemisphere, the objective 20 lying within one half thereof.

The objective 20 is so positioned within the end of the tube 10 that its plane surface 12 is outermost, and that the thickest portion thereof lies behind the outermost point of the exposed portion 22. It will be understood that the balance of the tube 10 contains within it numerous lenses, suitably spaced and arranged to provide a complete optical system. The arrangement and construction of the objective 20 in the manner shown will position the entrance pupil of the entire system at a very small point closely adjacent to, if not coincident with, the exposed portion 22. The field of vision which a system of this character provides is substantially conical, the apex of the cone lying at the entrance pupil. We have indicated in Fig. 3 by lines 26 and 27 the approximate bounds of the conical field of vision, the apex angle of the cone being about 45°, and the innermost limit thereof being defined by the line 26 which skirts the extension 16. It will be observed that the line 26 is substantially perpendicular to the exposed portion 22 of the objective. In this manner, a change of medium within the field of vision may change the axis of the cone, and thereby reduce the angle between the lines 26 and 27, but it will have no effect upon the position of the innermost limit 26.

We have shown the tube 10 as a substantially unbent element, such a construction being preferable for the purposes contemplated. It will be understood, however, that as to certain phases of our invention, this particular characteristic of the tube is not essential.

We have illustratively shown in Fig. 3 how the electrical connections may be associated with the lamp 17. The tubular element 10 may comprise an inner telescopic tube 28 and a snugly fitting sheath 29 therefor, the latter extending forwardly beyond the objective 20 to merge gradually into the extension referred to which includes the socket 16. The socket 16 is preferably so constructed as to render the sheath 29 one electrical conducting element, this sheath being, for example, electrically connected with the element 13 of Fig. 1. The other terminal of the socket may advantageously be associated with a conducting element or wire 30, suitably insulated from the sheath 29, extending rearwardly to the element 12 of Fig. 1, and lying between the tube 28 and the sheath 29, as shown in Fig. 3.

It will thus be observed that we have shown a device of extreme simplicity, yet highly efficient, and embodying features of advantage. Whether the medium within the body cavity be air, water, or anything else, the vision through the telescope will be an obliquely forward vision which will always include that portion of the field which lies directly alongside of the extension 16 and hence directly in front of the telescope. At the same time, the field will be effectively illuminated, and in no event will the lamp impair the field of vision by virtue of its location. The device may be utilized either alone or with an endoscopic tube. In the former case, it may be passed with great ease through passages of extreme smallness. Thus, for example, we have found it extremely efficient in examining the head sinuses, and by means of our device we have been enabled to examine directly such inaccessible portions as the ethmoidal cells. In this connection, a very great advantage of the present device lies in rendering the images erect and uninverted. Such direct illuminated vision of heretofore inaccessible portions has long been desired by the medical profession.

Where the device is employed with an endoscopic tube, the dimensions of the latter may be substantially smaller than those which have heretofore been found necessary. As a result, operations upon difficult and inaccessible internal portions may be performed with the aid of direct illuminated vision. And such operations may, if desired, be performed under water without affecting the advantageous vision.

It will be obvious that many changes in the details herein described and illustrated for the purpose of explaining the nature of our invention may be made by those skilled in the art without departing from the spirit and scope of the invention as expressed in the appended claims. It is therefore intended that these details be interpreted as illustrative, and not in a limiting sense.

Having thus described our invention and illustrated its use, what we claim as new and desire to secure by Letters Patent is—

1. A telescope of the character described having at its end a lamp-accommodating extension of reduced cross-section but lying wholly within the space bounded by the extended peripheral surface of said end, and an objective in said end, said objective being constructed and arranged to render visible through the telescope a field of vision alongside of the extension and whose innermost limit lies within said space, and said objective having its exposed surface perpendicular to the line defining said limit, whereby the latter will be unaffected by the medium in said field.

2. A telescope of the character described having at its end a lamp-accommodating extension of reduced cross-section but lying wholly within the space bounded by the extended peripheral surface of said end, and an objective in said end, said objective being constructed and arranged to render visible through the telescope a field of vision alongside of the extension and whose innermost limit lies within said space, and said objective comprising a plano-convex lens whose plane surface is outermost and perpendicular to the line defining said limit, whereby the latter will be unaffected by the medium in said field.

3. A telescope of the character described having at its end a lamp-accommodating extension of reduced cross-section but lying wholly within the space bounded by the extended peripheral surface of said end, and an objective in said end, said objective being constructed and arranged to render visible through the telescope an obliquely forward field of vision sufficiently offset to exclude the lamp therefrom, and said objective comprising a lens having a plane surface exposed outwardly and perpendicular to the line defining the innermost limit of said field, whereby said limit will be unaffected by the medium in said field.

4. A telescope of the character described having at its end a lamp-accommodating extension of reduced cross-section but lying wholly within the space bounded by the extended peripheral surface of said end, and an objective in said end, said objective being constructed and arranged to render visible through the telescope a field of vision alongside of the extension and whose innermost limit lies within said space, and said objective comprising an unsymmetrical plano-convex lens whose axis passes through the uncovered portion thereof and skirts said extension.

5. A telescope of the character described having at its end a lamp-accommodating extension of reduced cross-section but lying wholly within the space bounded by the extended peripheral surface of said end, and an objective in said end, said objective being constructed and arranged to render visible through the telescope a field of vision alongside of the extension and whose innermost limit lies within said space, and said objective comprising a cylindrical element whose opposite ends are ground to lie along surfaces defined by a plano-convex lens whose radius is substantially equal to the diameter of said element.

6. For use alone or with an endoscopic tube, a telescope of the character described, said telescope comprising a substantially cylindrical unbent tube having an objective in its end, and a lamp-accommodating extension carried at said end, said extension being of reduced cross-section but lying wholly within the cylindrical bounds of the tube, said objective being so constructed and arranged as to include within its field of vision the unoccupied portion of the space within said bounds and ahead of the objective, and said objective having its exposed surface arranged in a plane substantially perpendicular to the tube axis whereby said unoccupied portion will always be included within the field of vision regardless of the medium therein.

7. For use alone or with an endoscopic tube, a telescope of the character described, said telescope comprising a substantially cylindrical unbent tube having an objective in its end, and a lamp-accommodating extension carried at said end, said extension being of reduced cross-section but lying wholly within the cylindrical bounds of the tube, said objective comprising a cylindrical element occupying the entire end of the tube and having its opposite ends shaped to the surfaces of a plano-convex lens having its plane face outward and its axis offset with respect to the tube axis.

8. In a telescope of the character described, an objective lens comprising opposite surfaces defined by the opposite surfaces of an edge of a circular plano-convex lens whose radius is substantially equal to the diameter of the objective.

9. In a telescope of the character described, a cylindrical tube, and an objective in the end thereof, said objective comprising a cylindrical element snugly fitted within the tube end and having opposite faces lying along surfaces defined by an edge portion of a plano-convex lens of twice the tube diameter.

10. An illuminating telescope for the direct insertion into body cavities for examination thereof, said telescope comprising an unbent tubular element, optical devices therein including an objective at the end thereof, and a lamp socket comprising an extension carried by said end, said extension being of reduced cross-section but lying wholly within the bounds of the tubular element, said objective being partially covered by said extension but being constructed and arranged to position the entrance pupil of the optical system at the uncovered portion, and said objective presenting an exposed surface which is perpendicular to the axis of the tubular element, whereby direct forward illuminated vision is rendered possible, and whereby said forward vision is unaffected by the medium in front of the objective.

11. An illuminating telescope device for the direct insertion into a body cavity for examination of the latter, said device comprising an inner telescopic tube including an objective lens in its end, an outer metallic sheath therefor, a lamp socket comprising a tubular extension carried by said end and disposed wholly within the space bounded by the lateral surfaces of said sheath, and a conducting element between the inner tube and the sheath and electrically connected with one terminal of the socket.

12. An illuminating telescope device for the direct insertion into a body cavity for examination of the latter, said device comprising an inner telescopic tube including an objective lens in its end, an outer metallic sheath therefor, a lamp socket comprising a tubular extension carried by said end and disposed wholly within the space bounded by the lateral surfaces of said sheath, and a conducting element between the inner tube and the sheath and electrically connected with one terminal of the socket, said conducting element being insulated from the sheath, and the other terminal of the socket being electrically connected with the sheath.

In witness whereof, we have signed and sealed this specification this 15 day of October, 1926.

REINHOLD H. WAPPLER.
F. CHARLES WAPPLER.